(12) United States Patent
Ybarra Malo De Molina

(10) Patent No.: US 11,958,640 B2
(45) Date of Patent: Apr. 16, 2024

(54) CONNECTION SYSTEM AND CONNECTING METHOD FOR TRANSFERRING FLUIDS BETWEEN TWO VEHICLES OR BETWEEN A VEHICLE AND A FIXED STRUCTURE

(71) Applicant: SENER AEROESPACIAL, S.A., Las Arenas (ES)

(72) Inventor: Gabriel Ybarra Malo De Molina, Las Arenas (ES)

(73) Assignee: SENER AEROESPACIAL, S.A., Las Arenas (ES)

( * ) Notice: Subject to any disclaimer, the term of this patent is extended or adjusted under 35 U.S.C. 154(b) by 350 days.

(21) Appl. No.: 17/338,788

(22) Filed: Jun. 4, 2021

(65) Prior Publication Data

US 2022/0204191 A1 Jun. 30, 2022

(30) Foreign Application Priority Data

Dec. 28, 2020 (EP) .................................... 20383162

(51) Int. Cl.
*F16L 37/00* (2006.01)
*B64G 1/64* (2006.01)
(Continued)

(52) U.S. Cl.
CPC ............ *B64G 1/646* (2013.01); *F16L 37/002* (2013.01); *F16L 37/138* (2013.01); *F16L 37/34* (2013.01); *F16L 37/35* (2013.01)

(58) Field of Classification Search
CPC ......... F16L 37/002; F16L 37/34; F16L 37/35; B64G 1/646
See application file for complete search history.

(56) References Cited

U.S. PATENT DOCUMENTS 6,354,540 B1 3/2002 Lewis
8,006,937 B1 8/2011 Romano
(Continued)

FOREIGN PATENT DOCUMENTS

CN 108516110 A 9/2018
EP 2246608 A1 11/2010
(Continued)

OTHER PUBLICATIONS

Extended European Search Report in EP Application No. 20383162.3, dated Jun. 21, 2021, 6 pages.

*Primary Examiner* — Paul J Gray
(74) *Attorney, Agent, or Firm* — Edell, Shapiro & Finnan, LLC

(57) ABSTRACT

Connection systems and connecting methods for transferring fluids. According to one embodiment, the connection system includes an active unit having an active connection assembly connected to a first supply conduit and a passive unit including a passive connection assembly connected to a second supply conduit. The active connection assembly includes a first connector coupled to the first supply conduit, an active sleeve externally coupled to the first connector, and sealing means fixed inside the active sleeve which, in a fluid disconnection position, surrounds the first connector, preventing the outflow of fluid from the first connector. The passive connection assembly includes a second connector connected to a second supply conduit, the active unit including drive means for causing the movement of the active sleeve between the fluid disconnection position and a fluid connection position without axially moving the first and second connectors.

16 Claims, 10 Drawing Sheets

(51) Int. Cl.
 *F16L 37/138* (2006.01)
 *F16L 37/34* (2006.01)
 *F16L 37/35* (2006.01)

(56) References Cited

U.S. PATENT DOCUMENTS

| | | | |
|---|---|---|---|
| 9,231,323 | B1 | 1/2016 | Jaeger |
| 9,302,793 | B2 | 4/2016 | Ghofranian |
| 10,308,376 | B2 | 6/2019 | Yhuellou |
| 2012/0000575 | A1 | 1/2012 | Yandle et al. |
| 2018/0087683 | A1 | 3/2018 | Raven et al. |
| 2020/0361640 | A1* | 11/2020 | Dharmaraj ............. B64G 1/646 |

FOREIGN PATENT DOCUMENTS

| | | |
|---|---|---|
| EP | 3715264 A1 | 9/2020 |
| WO | 2007117373 A1 | 10/2007 |

\* cited by examiner

CONNECTION SYSTEM AND CONNECTING METHOD FOR TRANSFERRING FLUIDS BETWEEN TWO VEHICLES OR BETWEEN A VEHICLE AND A FIXED STRUCTURE

CROSS-REFERENCE TO RELATED APPLICATIONS

This application relates to and claims the benefit and priority to European Application No. EP20383162.3, filed Dec. 28, 2020.

TECHNICAL FIELD

The present invention relates to a connection system for transferring fluids between two vehicles, particularly between the berthing and docking mechanisms of space vehicles, or between a vehicle and a fixed structure, and to a connecting method for transferring fluids.

BACKGROUND

Methods and devices for the docking of a space vehicle as disclosed in U.S. Pat. No. 6,354,540B1, which describes an androgynous, low impact docking system, are known.

The international berthing and docking mechanism (IBDM) is a European androgynous, low impact docking system, which allows the berthing and docking of small- and large-sized space vehicles. It is compatible with the international docking system standard (IDSS) and, accordingly, it is compatible with the international docking adapters (IDA) on the U.S. side of the International Space Station (ISS).

The international berthing and docking mechanism comprises a hard capture system (HCS) the objective of which is to create a rigid and pressurized structural connection to allow communication between two manned spacecraft, as well as service connections and nominal and emergency separation functions. The hard capture system mainly comprises a tunnel which provides structural integrity, structural mating mechanisms, a separation system which generates the required axial thrust to push the vehicle away from the International Space Station once the required couplings are open, an umbilical connector for transferring power and data between both spacecraft, a cover for protecting against micrometeorite and orbital debris impacts, and a fluid transmission system, where fluid is understood to be any gaseous or liquid fluid, such as the required fuel, liquid coolant, etc.

EP3715264A1 describes a coupling assembly for fluidly connecting two spacecraft, the first spacecraft comprising a drive mechanism and the second spacecraft comprising a valve for filling and/or draining the second spacecraft. The coupling assembly comprises two connectors and a locking member. The first connector comprises an actuating member configured for engaging and opening the valve and a coupling member configured for being coupled to the drive mechanism such that said drive mechanism can exert a torque on the coupling member which enables rotation of said coupling member. The second connector comprises a stop and a bore for transferring fluid, said second connector being configured for being lead screwed onto the valve until the stop engages the valve.

U.S. Pat. No. 8,006,937B1 describes a docking interface mechanism for spacecraft providing active or passive assistance to a spacecraft in close proximity operations of docking such that spacecraft maneuvering is reduced. The mechanism comprises connections for transferring electrical power and transmitting control and data signals between spacecraft, and it allows transferring fluids under pressure. To that end, the mechanism comprises a connector including a sleeve, a SMA coupling coupled inside the sleeve, a pipe for the passage of fluids, and a heater mounted in the sleeve for controlling the coupling temperature. The connector is configured for being coupled to the corresponding connector of another docking interface mechanism when the SMA coupling is below an austenitic temperature of the SMA material. The coupling is configured for forming a rigid mechanical connection with the other coupling when the temperature of the SMA coupling increases until reaching the austenitic temperature. The coupling allows releasing the mechanical connection when the temperature of the SMA coupling drops to a martensitic temperature.

SUMMARY

Disclosed is a connection system for transferring fluids between any two vehicles or between a vehicle and a fixed structure, and a connecting method for transferring fluids between two vehicles or between a vehicle and a fixed structure.

One aspect of the invention relates to a connection system for transferring fluids comprising an active unit configured for being fixed to one of the vehicles and a passive unit configured for being fixed to the other vehicle or to the fixed structure, the active unit comprising an active connection assembly connected to a supply conduit and the passive unit comprising a passive connection assembly connected to another supply conduit.

The active connection assembly comprises a connector connected to the corresponding supply conduit, an active sleeve externally coupled to said connector, and sealing means fixed inside the active sleeve which, in a fluid disconnection position, surround the connector, preventing the outflow of fluid from said connector. The passive connection assembly comprises a connector connected to the corresponding supply conduit.

The active unit further comprises drive means configured for causing the movement of the active sleeve from the fluid disconnection position to the fluid connection position without axially moving the respective connectors of the active connection assembly and of the passive connection assembly, such that in the fluid connection position, the active sleeve partially houses the connector of the passive connection assembly, the sealing means of the active connection assembly being arranged on the connector of the passive connection assembly such that they allow fluid communication between both supply conduits through the respective connectors of the active connection assembly and of the passive connection assembly.

Another aspect of the invention relates to a vehicle comprising the active unit or the passive unit of the previous connection system.

Another aspect of the invention relates to a connecting method for transferring fluids between vehicles or between a vehicle and a fixed structure with the previous connection system, the method comprising the following steps:
 docking both vehicles or the vehicle and the fixed structure,
 operating the drive means of the active unit which axially move the active sleeve, the active sleeve moving to the connection position in which the sealing means of the active connection assembly allow fluid communication between both supply conduits through the connector of the active connection assembly and through the connector of the passive connection assembly, and supplying the corresponding fluid.

The force generated by the pressure of the fluid is thereby transmitted directly to the berthing and docking system, particularly to tunnels of said berthing and docking system wherein the active unit and the passive unit are respectively fixed such that the connection system for transferring fluids is not subjected to loads and is therefore much more lightweight and optimized than what is known in the state of the art.

Moreover, given that only the active sleeve is moved, with the connector of the active connection assembly, the connector of the passive connection assembly, and the respective supply conduits remaining stationary, the number of parts moved in the connection system is reduced to a minimum. Furthermore, it enables the supply conduits to be rigid or semi-rigid, where it is possible to use other materials such as stainless steel, ensuring a long service life, which is not possible with the elastomer hoses that are used today, since they deteriorate in abrasive environments. Furthermore, the fact that the supply conduits are rigid or semi-rigid prevents having a flexible element (hose) constantly moving and possibly hitting the rest of the parts.

These and other advantages and features will become apparent in view of the figures and detailed description.

DETAILED DESCRIPTION

Figure 1:
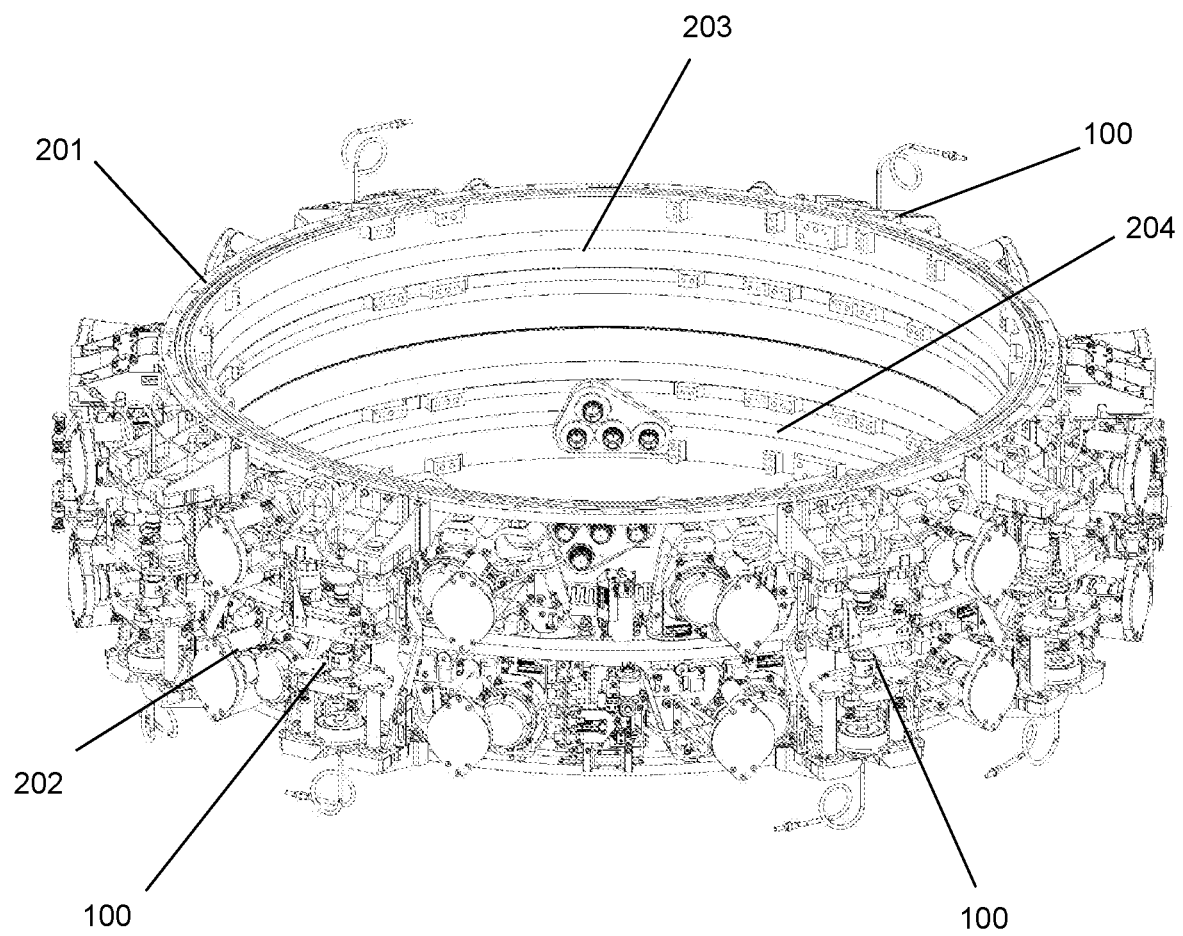
FIG. 1 shows a view of an international berthing and docking mechanism of a space vehicle comprising several connection systems for transferring fluids.

The connection system 100 for transferring fluids between two vehicles, or between a vehicle and a fixed structure comprises an active unit 110 fixed to one of the vehicles and a passive unit 150 fixed to the other vehicle, the active unit 110 comprising an active connection assembly 140 connected to a supply conduit 114 and a passive connection assembly 160 connected to another supply conduit 154. The supply conduits 114 and 154 are connected respectively to a respective tank (not depicted) storing the fluid.

The active connection assembly 140 of the connection system 100 comprises a connector 141 coupled to the respective supply conduit 114, an active sleeve 145 externally coupled to said connector 141, and sealing means 146 fixed inside the active sleeve 145 which, in a fluid disconnection position, surrounds the connector 141, preventing the outflow of fluid from said connector. The passive connection assembly 160 comprises a connector 161 connected to the corresponding supply conduit 154. The active unit 110 comprises drive means 115 configured for causing the movement of the active sleeve 145 from the fluid disconnection position to the fluid connection position without axially moving the respective connectors 141 and 161 of the active connection assembly 140 and of the passive connection assembly 160 such that in the fluid connection position, the active sleeve 145 partially houses the connector 161 of the passive connection assembly 160, the sealing means 146 of the active connection assembly 140 being arranged on the connector of the passive connection assembly 160 such that it allows fluid communication between both supply conduits 114 and 154 through the respective connectors 141 and 161 of the active connection assembly 140 and of the passive connection assembly 160.

Since the connectors 141 and 161 do not move, the supply conduits 114 and 154 do not have to move either, which is a clear advantage in that it allows said supply conduits 154 to be rigid or semi-rigid, where it is possible to use other materials such as stainless steel, ensuring a service life of at least 15 years, which is not possible with the elastomer hoses that are used today. Furthermore, the fact that the supply conduits 114 and 154 are rigid or semi-rigid prevents having a flexible element (hose) constantly moving in space and possibly hitting the rest of the parts.

The connector 141 comprises a body 142 coupled to the supply conduit 114 and a needle 143 fixed to said body 142, said needle 143 being hollow for the passage of fluid from the supply conduit 114 through the body 142 and said needle 143 including at least one bore 144 for the outflow of fluid. The active sleeve 145 is arranged surrounding the outside of the needle 143. Particularly, the active sleeve 145 is arranged substantially concentric to the needle 143. In the fluid disconnection position, the sealing means 145 surrounds the needle 143 downstream of the bore 144, sealing the fluid outlet. In the connection position, the connector 141 of the active connection assembly 140 is arranged substantially coaxial to the connector 161 of the passive connection assembly 160. In said connection position, the active sleeve 145 is axially moved with respect to the needle 143, protruding with respect to said needle 143, such that the sealing means 146 does not seal against the needle 143 and, therefore, does not prevent the outflow of fluid through the bore 144. In the embodiment shown in the figures, the needle 143 is closed at the free end and includes several radial bores 144 for the outflow of fluid.

Moreover, the connector 161 of the passive connection assembly 160 comprises a body 162 coupled to the supply conduit 154 and a needle 163 fixed to said body 162, said needle 163 being hollow for the passage of the fluid through the body 162 towards the supply conduit 154 and said needle 163 including at least one bore 164 for the inflow of fluid. The passive sleeve 165 is arranged surrounding the outside of the needle 163. Particularly, the passive sleeve 165 is arranged substantially concentric to the needle 163. In the connection position, the connector 161 of the passive connection assembly 160 is arranged substantially coaxial to the connector 141 of the active connection assembly 140, the sealing means 146 of the active connection assembly 140 surrounding the needle 163 of the passive connection assembly 160 upstream of the bore 164, allowing the inflow of fluid through the bore 164. In the embodiment shown in the figures, the needle 163 is closed at the free end and includes several radial bores 163 for the inflow of fluid.

The active unit 110 comprises a main support 111 wherein the connector 141 of the active connection assembly 140 is coupled and wherein the drive means 115 is supported. The connector 141, particularly the body 142 of the connector 141, is coupled to the main support 111 through a spherical articulation 113.

Moreover, the passive unit 150 comprises a main support 151 wherein the connector 161 of the passive connection assembly 150 is coupled through a spherical articulation 153. Particularly, the body 162 of the connector 161 is coupled to the main support 151 through the spherical articulation 153.

Disconnection position is understood to mean the position of the active units 110 and passive unit 150 once the vehicles have berthed or docked, wherein the active unit 110 and passive unit 150 are still in a position prior to the connection position (and therefore the fluid transfer position).

The drive means 115 of the active sleeve 145, shown in detail in FIGS. 6 to 10, is supported in the main support 111 and comprise at least one lead screw 119 configured for driving the auxiliary support 148 and substantially moving the active sleeve 145 vertically and a geared motor 116 configured for driving the lead screw 119. In an embodiment shown in the figures, the drive means 115 further comprises gears 117 between the lead screw 119 and the geared motor 116. In the embodiment shown in the figures, the drive means 115 comprises two lead screws 119 arranged in a symmetrical manner with respect to the geared motor 116, the two lead screws 119 being configured for operating synchronously.

Each lead screw 119 is housed inside a respective casing 120 which prevents the entry contamination therein, in addition to providing support for the auxiliary support 148 when the active sleeve 145 is retracted. The lead screws 119 cannot move backwards by themselves from the connection position to the disconnection position for safety reasons, such that if power is cut off in the connection position, the lead screws 119 would still remain in said position.

In a preferred embodiment, the geared motor 116 is arranged vertically, parallel to the lead screws 19, said lead screws 19 and the corresponding gears 117 being arranged coupled to the geared motor 116 and to the lead screws 119 in a symmetrical manner with respect to the geared motor 116 surrounding the connection assembly 140. The connection assembly 140 is arranged substantially parallel with the lead screws 119.

In the embodiment shown in the figures, the passive connection assembly 160 comprises a passive sleeve 165 externally coupled to the connector 161 of the passive connection assembly 160 and sealing means 166 fixed inside the passive sleeve 165, said sealing means 166 surrounding said connector 161 such that, in the fluid disconnection position, said sealing means 166 prevents the passage of fluid through said connector 161, and in the fluid connection position, allows the passage of fluid through the connector 161 due to the active sleeve 145 having caused the movement of the passive sleeve 165 with respect to the connector 161 of the passive connection assembly 160.

Starting from the disconnection position, in which the active sleeve 145 and the passive sleeve 165 are in direct contact and the ends of the needles 143 and 163 of the respective connectors 141 and 161 are housed respectively inside the active sleeve 145 and the passive sleeve 165, when the drive means 115 begins operating, it moves the active sleeve 145 which in turn pushes the passive sleeve 165, compressing a spring 180 of the passive unit 150 until reaching the connection position. The sealing means 146 and 166 are moved together with the corresponding active sleeve 145 and/or passive sleeve 165.

In the connection position, the sealing means 146 of the active connection assembly 140 surrounds the needle 163 of the passive connection assembly 160 given that the active sleeve 145 partially houses said needle 163 of the passive connection assembly 160, allowing the outflow of fluid. In the fluid connection position, the sealing means 146 of the active connection assembly 140 seals against the needle 163 of the passive connection assembly 160 upstream of the bore 164 or bores 164 of said needle 163 such that said sealing means 146 does not prevent the inflow of fluid in the connector 161 of the passive connection assembly 160 through the bore 164 or bores 164.

Moreover, the connection system 100 comprises compensation means 130 and 170 in the active unit 110 and in the passive unit 150, respectively, configured for absorbing potential angular and/or axial offsets during the coupling of the active unit 110 with the passive unit 150. The active sleeve 145 is coupled to the main support 111 of the active unit 110 and the passive sleeve 165 is coupled to the main support 151 of the passive unit 150 through respective compensation means 170.

Each compensation means 130 and 170 of the active unit 140 and of the passive unit 150, respectively, comprises a floating support 135 and 175 where the corresponding active sleeve 145 or passive sleeve 165 is coupled, and at least one regulating element 132 and 172, configured for coupling the floating support 135 and 175 to the corresponding auxiliary support 148 and 168.

In the embodiment shown in the figures, the active connection assembly 140 is identical to the passive connection assembly 160.

The respective needle 143 and 163 of the active connection assembly 140 and of the passive connection assembly 160 respectively goes through the auxiliary support 148 of the active connection assembly 140 and the auxiliary support 168 of the passive connection assembly 160. The active sleeve 145 goes through the respective auxiliary support 148 and is coupled in a fixed manner to said auxiliary support 148. Moreover, the passive sleeve 165 goes through the respective auxiliary support 168 and is coupled in a fixed manner to said auxiliary support 168. In the event of a vertical misalignment between the active unit 110 and the passive unit 150, the compensation means 130 and 170 would act by compensating for said misalignment.

Moreover, the connection system for transferring fluids 100 comprises guide means 190 coupled to the outside of the passive sleeve 165 and configured for aligning and guiding the coupling between the active coupling assembly 140 and the passive coupling assembly 160. The guide means 190 comprises a guide 191 coupled substantially concentric to the passive sleeve 165. The guide 191 is fixed to the floating support 175 of the passive unit 150. The guide 191 comprises an intermediate region 192 with openings 193 to enable the outflow of gases or any other particle which may have entered the guide 191. Said gases could generate excess pressures in the elements of the active unit 110 and/or of the passive unit 150, which is inadmissible. Moreover, the particles that may be inside the guide 191 would be ejected through the openings 193 once the active sleeve 145 is introduced into the guide 191.

In a preferred embodiment, the guide 191 is substantially cylindrical and has in the intermediate region 192 an inner diameter greater than the outer diameter of the passive sleeve 165 which favors the outflow of gases or other particles through the openings 193. Furthermore, the passive unit 150 comprises a sleeve 194 between the guide 191 and the passive sleeve 165, the purpose of which is to minimize friction between the guide 191 and the passive sleeve 165 during the movement of the passive sleeve 165 with respect to the guide 191. This sleeve 194 arranged between the guide 191 and the passive sleeve 165 is fixed integrally to the guide 191. Preferably, the sleeve 194 arranged between the guide 191 and the passive sleeve 165 is made of a plastic material.

Another aspect of the invention relates to a connecting method for transferring fluids between vehicles with the connection system described above, the method comprising the following steps:

docking the vehicles, or vehicle and fixed structure, with respect to one another, operating the drive means 115 of the active unit 110 which axially move the active sleeve 145 to the connection position in which the sealing means 146 of the active connection assembly 140 allows fluid communication between both supply conduits 114 and 154 through the connector 141 of the active connection assembly 140 and through the connector 161 of the passive connection assembly 160, and supplying the corresponding fluid.

The movement of the active sleeve 145 for coupling with the connector 161 of the passive connection assembly 160 is a guided movement, said guided movement being carried out through the guide means 190 arranged in the passive unit 150 which have previously been described.

Moreover, during the movement of the active sleeve 145, the path of said active sleeve 145 is compensated for in order to prevent angular and/or axial offsets with respect to the passive connection assembly 160. Said compensation/regulation is carried out by the compensation means 130 comprised in the active unit 110 described in detail herein.

Once the transfer of fluid ends, the drive means 115 stops driving the active sleeve 145, said active sleeve 145 returning to the disconnection position driven by the geared motor 116.

In the embodiment shown in the figures, wherein the active unit 150 comprises the passive sleeve 165, once the active sleeve 145 contacts the passive sleeve 165, the drive means 115 continue to move both sleeves 145 and 165 axially with respect to the respective connectors 141 and 161, the active sleeve 145 being coupled to the connector 161 of the passive connection assembly 160 such that the active sleeve 145 houses therein the needle 163 of said connector 161 while the spring 181 of the passive unit 150 on which the passive sleeve 165 is supported is being compressed, until reaching the connection position in which the sealing means 146 and 166 enable fluid communication between both connectors 141 and 161.

The movement of the active sleeve 145 for coupling with the connector 161 of the passive connection assembly 160 is a guided movement, said guided movement being carried out through the guide means 190 arranged in the passive unit 150 which have previously been described.

Moreover, during the movement of the active sleeve 145, the path of the passive sleeve 165 is also compensated for in order to prevent angular and/or axial offsets with respect to the fixed support 111 and with respect to the active sleeve 145. Said compensation/regulation is carried out by the compensation means 170 comprised in the passive unit 150 described in detail herein.

Once the transfer of fluid ends and the drive means 115 stops driving the active sleeve 145, the passive sleeve 165 returns to the initial disconnection position driven by the spring 180.

What has been described for any of the embodiments and/or configurations of the connection system is also valid for the embodiments and/or configurations of the connecting method.

Figure 2:
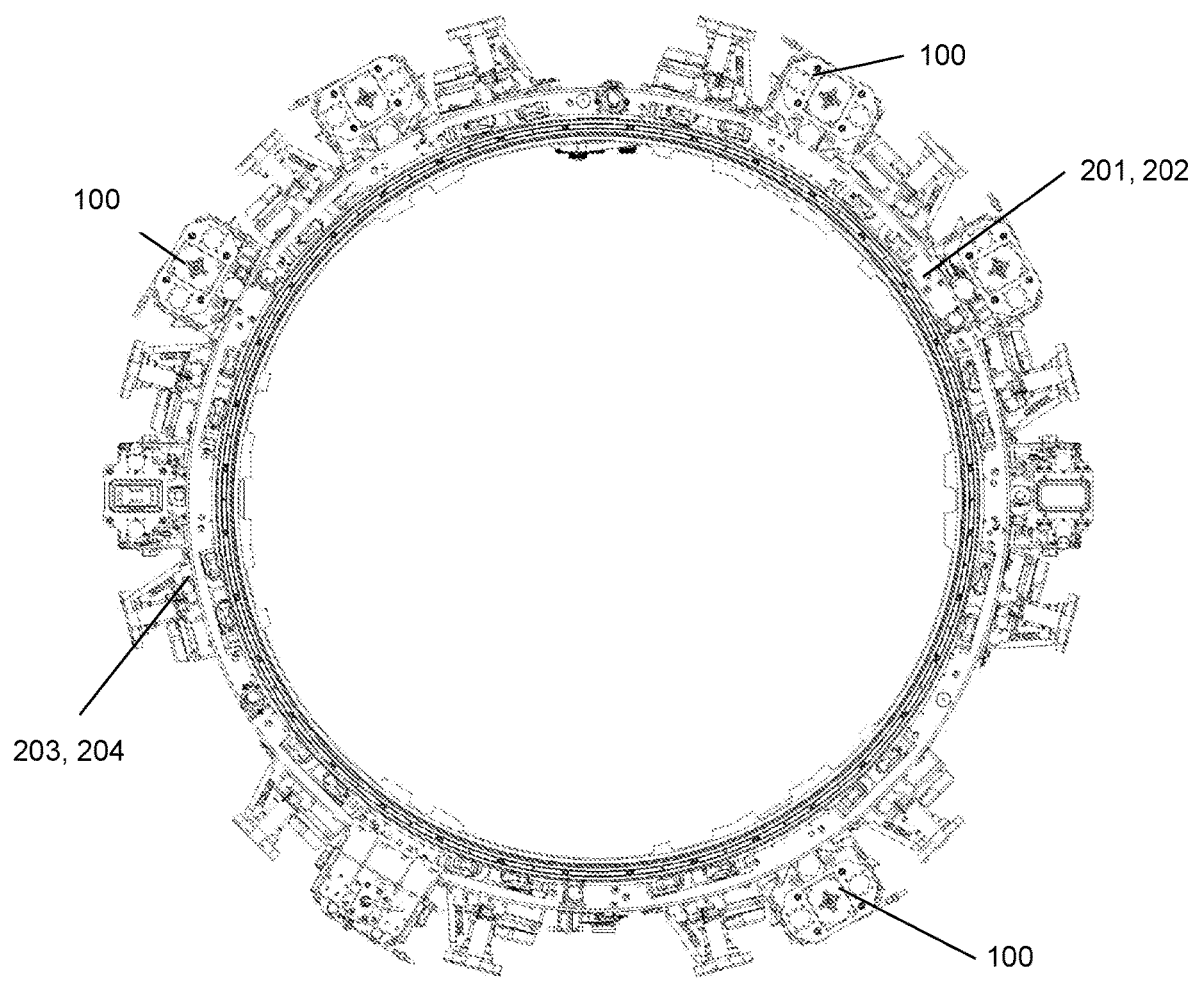
FIG. 2 shows a partial plan view of the international berthing and docking mechanism shown in FIG. 1.
Figure 3:
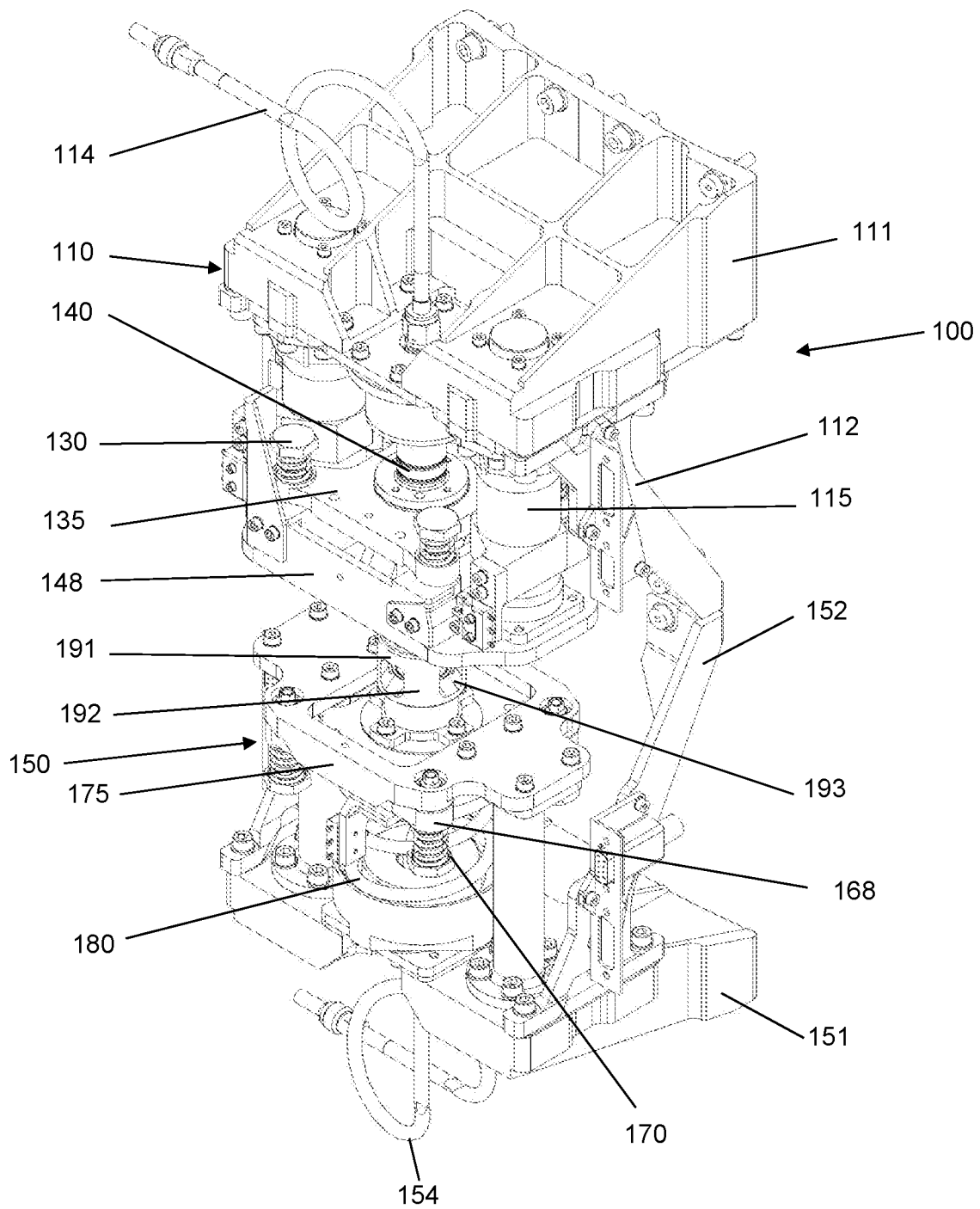
FIG. 3 shows a perspective view of the connection system shown in FIG. 1 in a fluid disconnection position.
Figure 4:
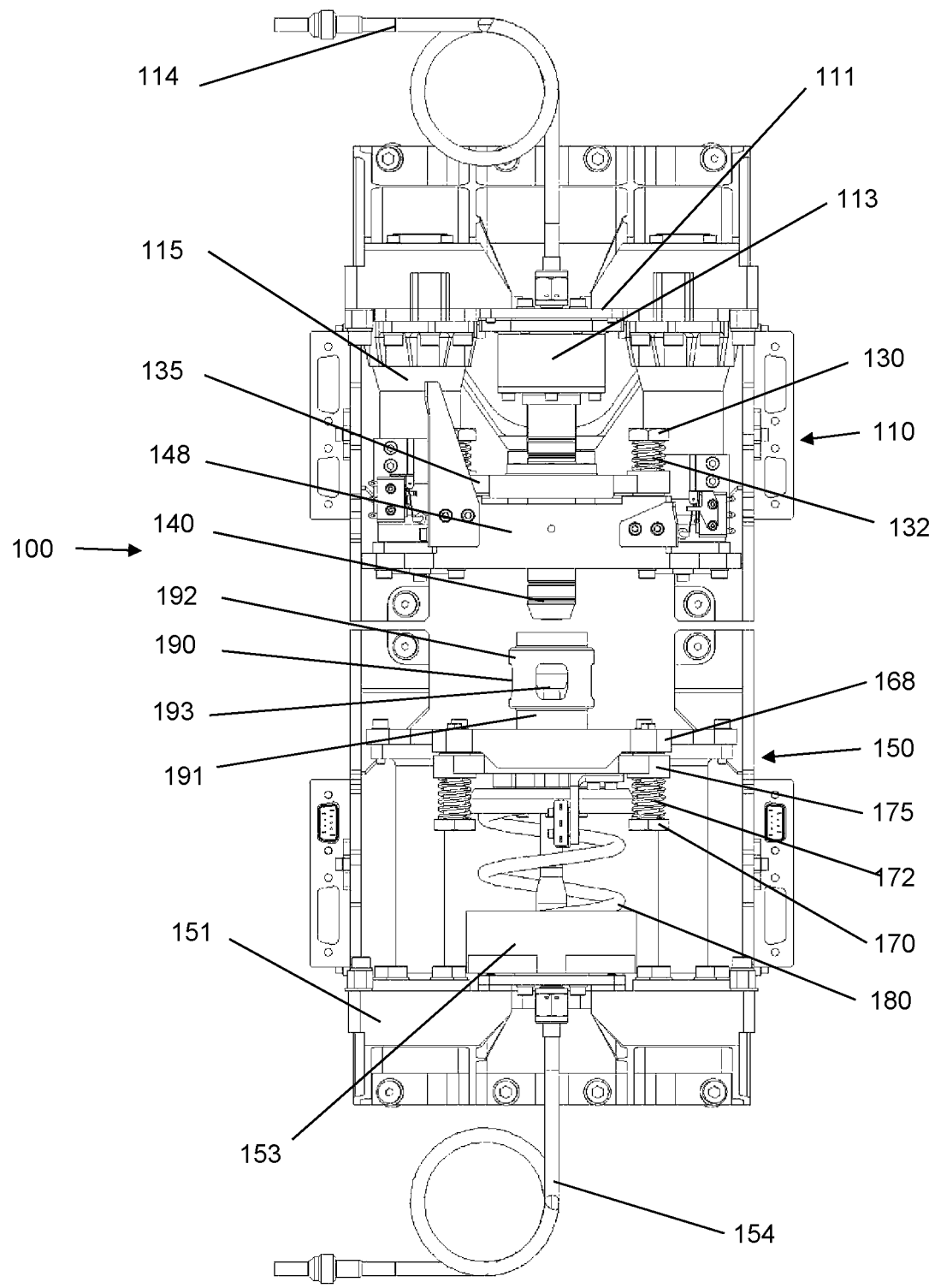
FIG. 4 shows a front view of the connection system shown in FIG. 3.
Figure 5:
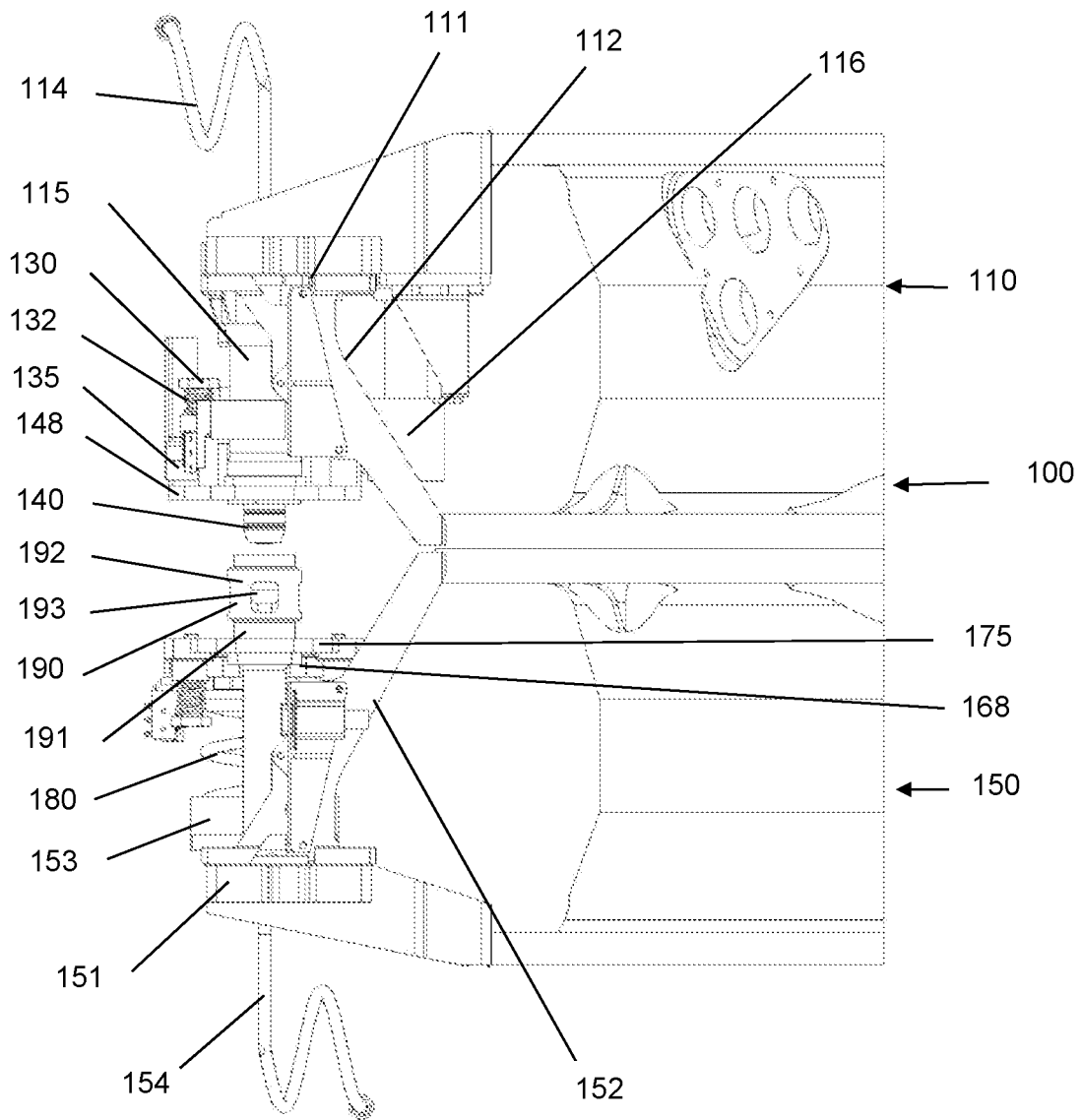
FIG. 5 shows a side view of the connection system shown in FIG. 3.
Figure 6:
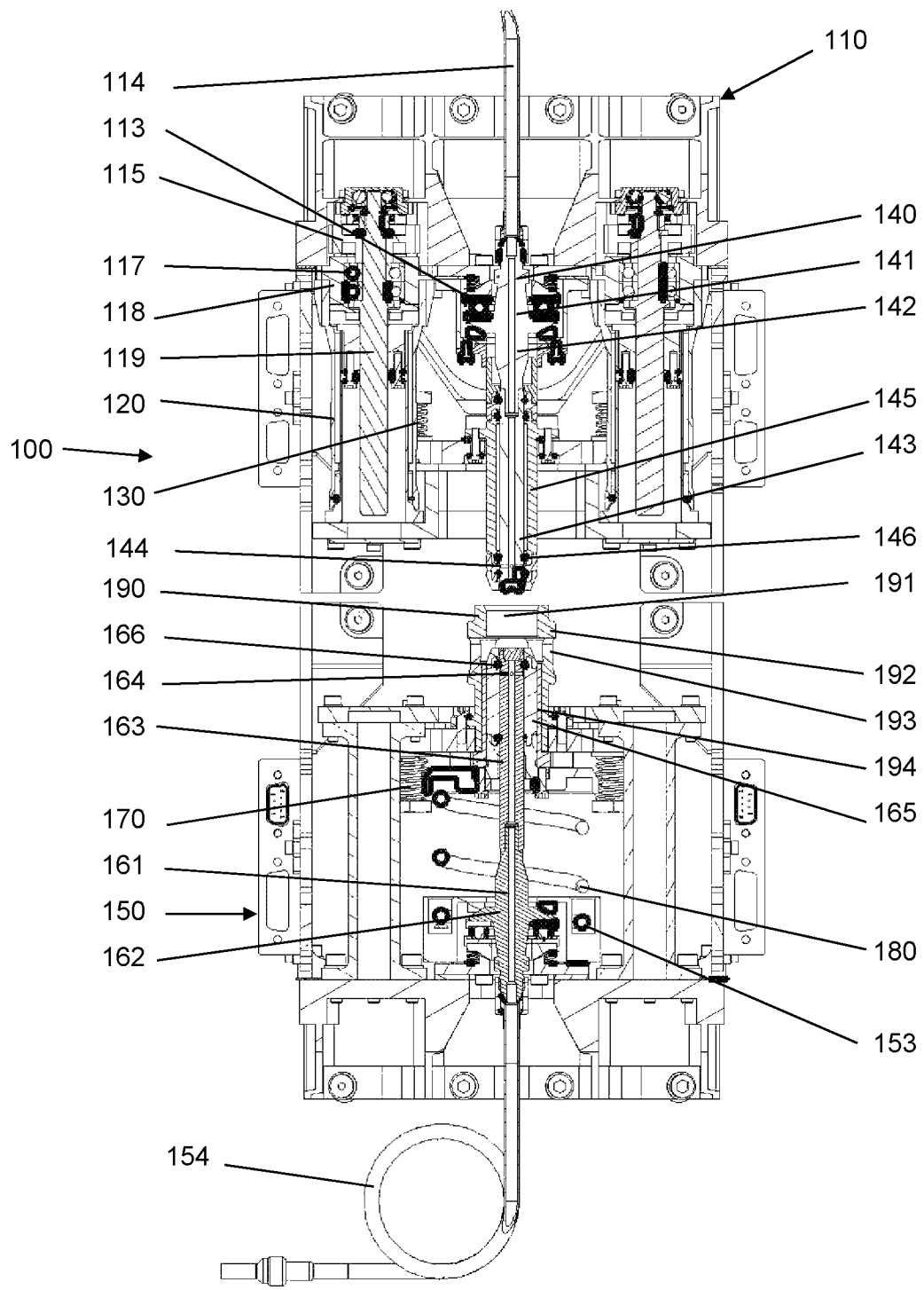
FIG. 6 shows a sectioned view of the connection system shown in FIG. 3.
Figure 7:
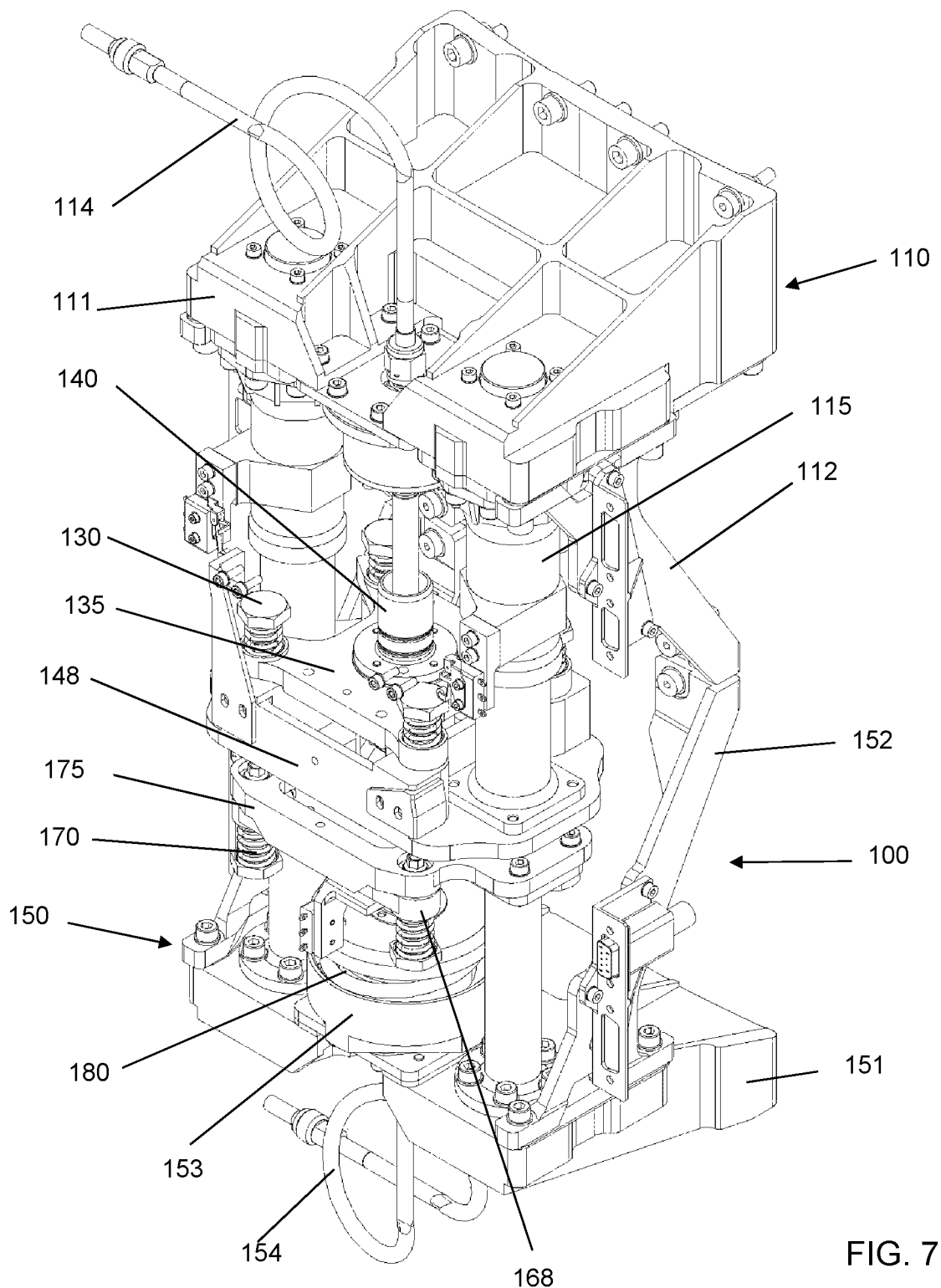
FIG. 7 shows a perspective view of the connection system shown in FIG. 1 in a fluid connection position.
Figure 8:
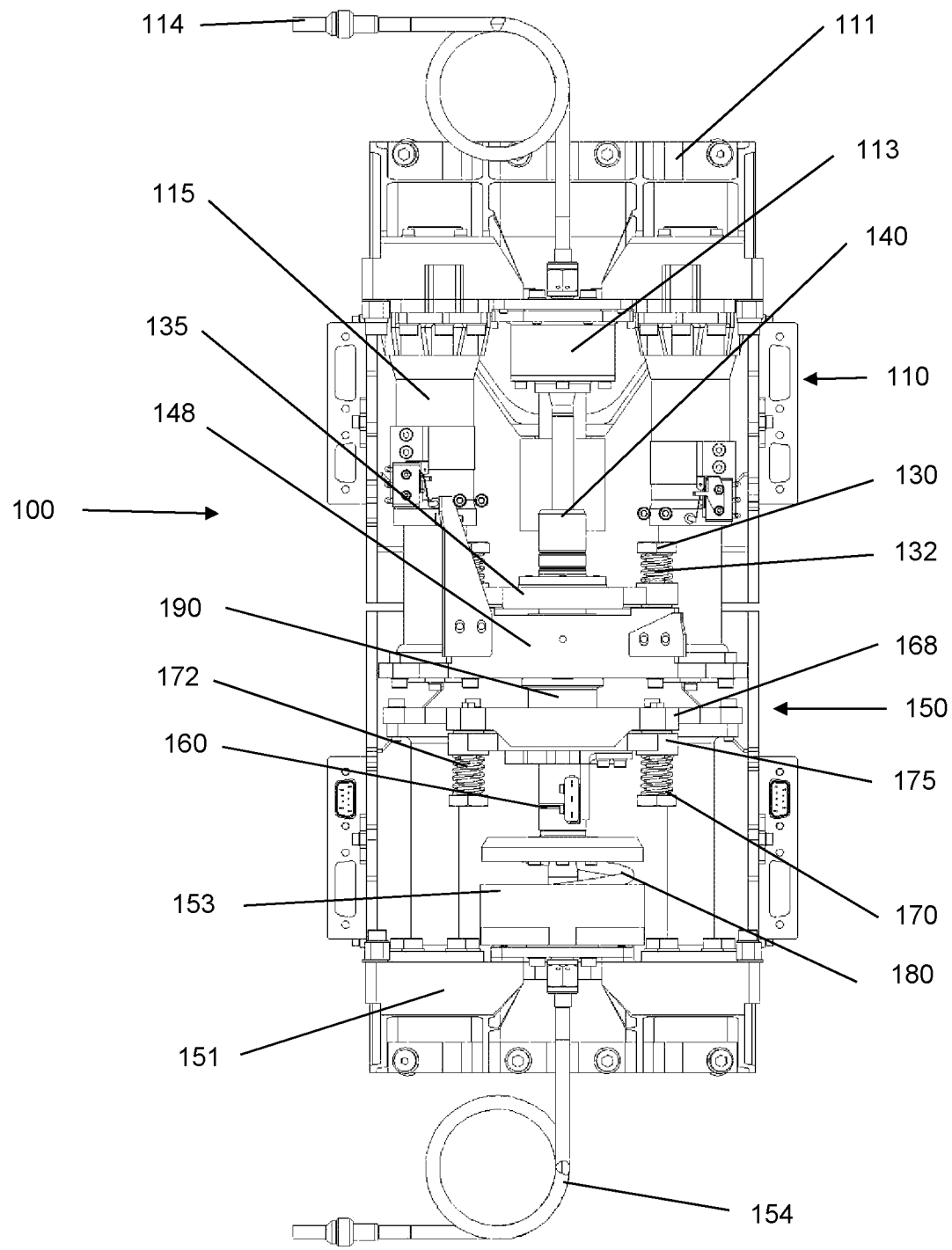
FIG. 8 shows a front view of the connection system shown in FIG. 7.
Figure 9:
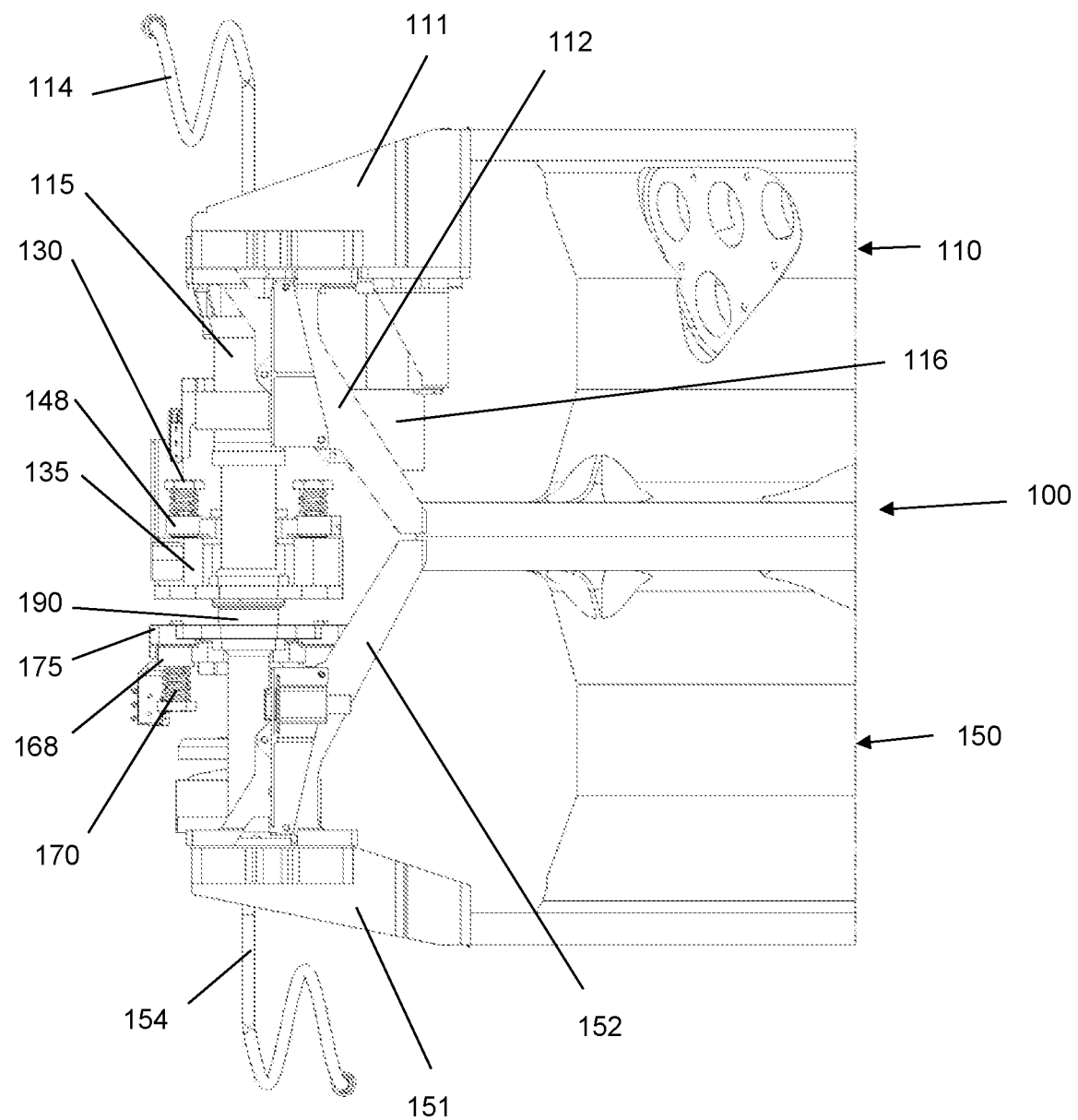
FIG. 9 shows a side view of the connection system shown in FIG. 7.
Figure 10:
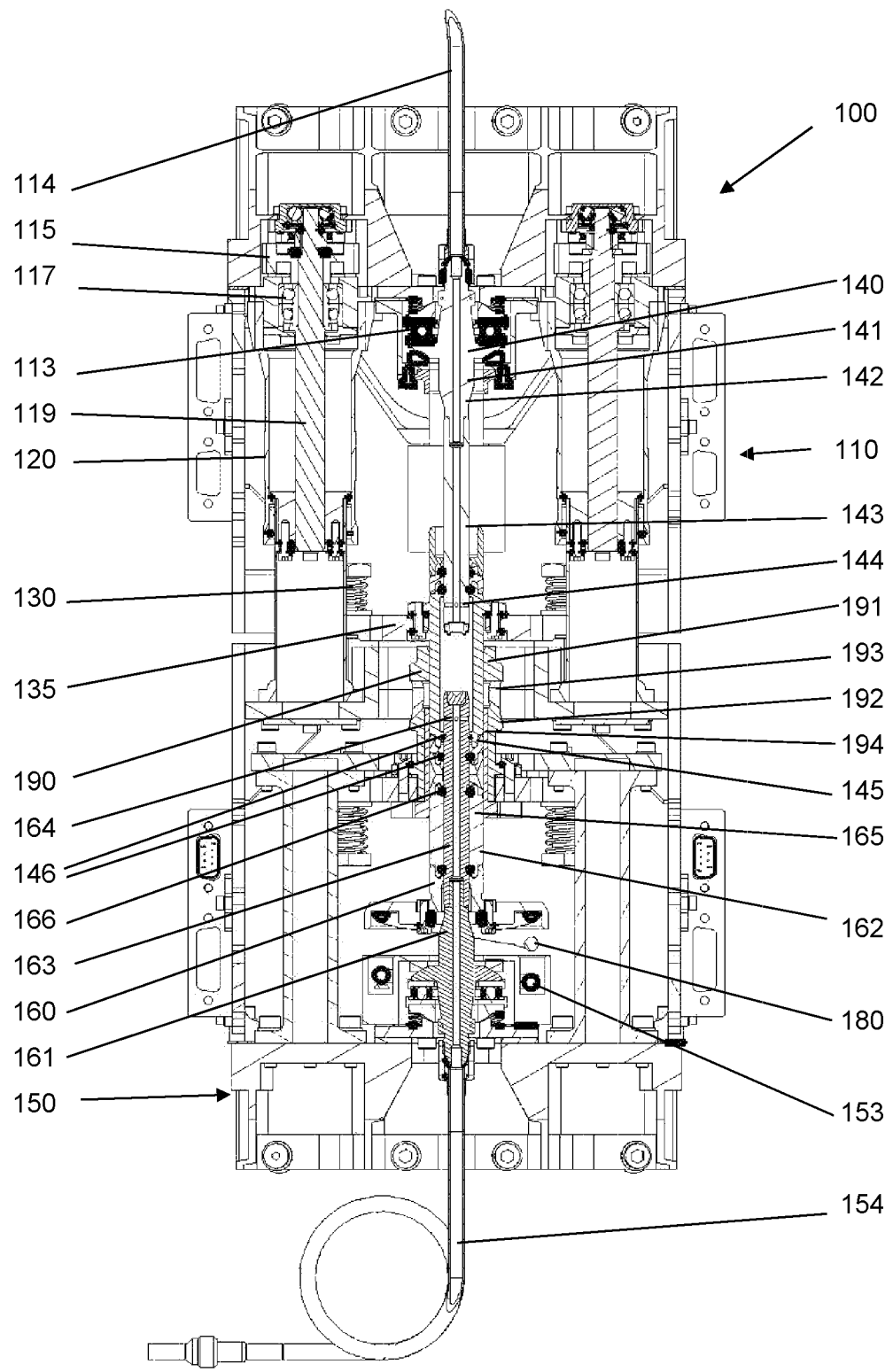
FIG. 10 shows a sectioned view of the connection system shown in FIG. 7.

Lastly, FIGS. 1 and 2 show part of the berthing and docking mechanisms 201 and 202 of two space vehicles (not depicted). Preferably, these berthing and docking mechanisms 201 and 202 are international berthing and docking mechanisms (also known as IBDM), although they could be any other compatible berthing and docking mechanism, such as the international docking adapters present on the US side of the International Space Station.

Each international berthing and docking mechanism 201 and 201 comprises a tunnel 203 and 204 which provides structural integrity and an active unit 110 or a passive unit 150 of the connection system 100 according to the invention for transferring fluids between both space vehicles. In the embodiment shown in the figures, the berthing and docking mechanisms 201 and 202 comprise four connection systems 100 for transferring two different fluids, i.e., each connection system 100 transfers one type of fluid, but for safety reasons two independent connection systems are arranged for each fluid redundantly. Fluid (throughout the entire description) is understood to mean any type of liquid or gaseous fluid.

In other non-depicted embodiments in which the transfer of three fluids is required, the berthing and docking mechanisms will comprise six independent connection systems, each of which will exchange one fluid, three of which systems will be redundant.

In the embodiment shown in the figures, the active unit 110 is fixed to the tunnel 203 of the berthing mechanism 201 of one of the two spacecraft, particularly through struts 112, and the passive unit 150 is fixed to the tunnel 204 of the berthing mechanism 202 of the other spacecraft through respective struts 152. In other embodiments, the active unit 110 and the passive unit 150 can be fixed to other parts of the corresponding spacecraft without being part of the berthing and docking mechanism.

Lastly, although the figures show a connection system for transferring fluids between two space vehicles, the invention is not limited to said space vehicles, it being possible to use it in any other type of vehicles, such as for example, two airplanes docking while in flight for refueling, or in a vehicle docked to a fixed structure so as to proceed to refueling of the vehicle.

Embodiments are also disclosed in the clauses that follow.

Clause 1. Connection system for transferring fluids between two vehicles or between a vehicle and a fixed structure, the connection system (100) comprising an active unit (110) configured for being fixed to one of the vehicles and a passive unit (150) configured for being fixed to the other vehicle or to the structure, the active unit (110) comprising an active connection assembly (140) connected to a supply conduit (114), and the passive unit (150) comprising a passive connection assembly (155) connected to another supply conduit (154), the active connection assembly (140) comprises a connector (141) coupled to the corresponding supply conduit (114), an active sleeve (145) externally coupled to said connector (141), and sealing means (146) fixed inside the active sleeve (145) which, in a fluid disconnection position, surround the connector (141), preventing the outflow of fluid from said connector (141), and the passive connection assembly (160) comprises a connector (161) connected to the corresponding supply conduit (154), the active unit (110) including drive means (115) configured for causing the movement of the active sleeve (145) from the fluid disconnection position to a fluid connection position without axially moving the respective connectors (141, 161) of the active connection assembly (140) and of the passive connection assembly (160), such that in the fluid connection position, the active sleeve (145) partially houses the connector (161) of the passive connection assembly (160), the sealing means (146) of the active connection assembly (140) being arranged on the connector of the passive connection assembly (160), such that they allow fluid communication between both supply conduits (114, 154) through the respective connectors (141,161) of the active connection assembly (140) and of the passive connection assembly (160).

Clause 2. Connection system according to the preceding clause, wherein the connector (141) of the active connection assembly (140) comprises a body (142) coupled to the respective supply conduit (114), a hollow needle (143) fixed to said body (142), and including at least one bore (144) for the passage of fluid from the supply conduit (114) through the body (142), the active sleeve (145) being arranged surrounding said needle (143) such that, in the fluid disconnection position, the sealing means (146) surround the needle (143) downstream of the bore (144) sealing the fluid outlet and, in the fluid connection position, in which the connector (141) of the active connection assembly (140) is arranged substantially coaxial to the connector (161) of the passive connection assembly (160), said sealing means (146) do not surround the needle (143).

Clause 3. Connection system according to any of the preceding clauses, wherein the connector (161) of the passive connection assembly (160) comprises a body (162) coupled to the respective supply conduit (154), and a hollow needle (163) fixed to said body (162) and including at least one bore (164) for the passage of fluid to the corresponding supply conduit (154) through the body (162), the connector (161) of the passive connection assembly (160), in the fluid connection position, being arranged substantially coaxial to the connector (141) of the active connection assembly (140), the sealing means (146) of the active connection assembly (140) surrounding the needle (163) of the passive connection assembly (160) upstream of the corresponding bore (164), allowing the inflow of fluid through the bore (164).

Clause 4. Connection system according to any of the preceding clauses, wherein the active unit (110) comprises a main support (111) wherein the connector (141) of the active connection assembly (140) is coupled and wherein the drive means (115) are supported, and an auxiliary support (148) wherein the active sleeve (145) is coupled, the drive means (115) comprising at least one lead screw (119) configured for driving the auxiliary support (148) and substantially moving the active sleeve (145) vertically and a geared motor (116) configured for driving the lead screw (119).

Clause 5. Connection system according to the preceding clause, wherein the connector (141) of the active connection assembly (140) is coupled to the main support (111) of the active connection assembly (140) and/or the connector (161) of the passive connection assembly (160) is coupled to a main support (151) of the passive connection assembly (160) through a respective spherical articulation.

Clause 6. Connection system according to clause 4 or 5, wherein the active unit (110) comprises compensation means (130) configured for absorbing angular and/or axial offsets in the coupling of the active unit (110) with the passive unit (150), the active sleeve (145) being coupled to the auxiliary support (148) through the compensation means (130).

Clause 7. Connection system according to the preceding clause, wherein the compensation means (130) comprise a floating support (135) and at least one regulating element (132), the active sleeve (145) being fixed to said floating support (135) and the floating support (135) being coupled to the auxiliary support (148) through the regulating element (132).

Clause 8. Connection system according to any of the preceding clauses, wherein the passive connection assembly (160) comprises a passive sleeve (165) externally coupled to the connector (161) of the passive connection assembly (160) and sealing means (166) fixed inside the passive sleeve (165), said sealing means (166) surrounding said connector (161) such that, in the fluid disconnection position, said sealing means (166) prevent the passage of fluid through said connector (161) and, in the fluid connection position, allow the passage of fluid through the connector (161) due to the active sleeve (145) having caused the movement of the passive sleeve (165) with respect to the connector (161) of the passive connection assembly (160).

Clause 9. Connection system according to the preceding clause, wherein the passive unit (150) comprises compensation means (170) configured for absorbing angular and/or axial offsets in movement of the passive sleeve (165), the passive sleeve (165) being coupled to an auxiliary support (168) of the passive unit (110) through the compensation means (170).

Clause 10. Connection system according to the preceding clause, wherein the compensation means (170) comprise a floating support (175) and at least one regulating element (171), the passive sleeve (165) being fixed to said floating support (175) and the floating support (175) being coupled to the auxiliary support (168) through the regulating element (171).

Clause 11. Connection system according to any of clauses 8 to 10, comprising guide means (190) coupled to the outside of the passive sleeve (165) and configured for aligning and guiding the coupling between the active connection assembly (140) and the passive connection assembly (160), housing the active sleeve (145) therein.

Clause 12. Connection system according to the preceding clause, wherein the guide means (190) comprise a guide (191) coupled substantially concentric to the passive sleeve (165), the guide (191) comprising an intermediate region (192) with openings (193) to enable the outflow of gases or any other particle which may have entered the guide (191), the intermediate region (192) preferably comprising an inner diameter greater than the outer diameter of the passive sleeve (165), which favors the outflow of gases or other particles through the openings (193).

Clause 13. Vehicle comprising an active unit (120) or a passive unit (150) of the connection system (100) for transferring fluids according to any of the preceding clauses.

Clause 14. Connecting method for transferring fluids in a connection system between two vehicles or between a vehicle and a structure according to any of clauses 1 to 12, comprising the following steps:

docking both vehicles or the vehicle and the structure,
operating the drive means (115) of the active unit (110) which axially move the active sleeve (145), the active sleeve (145) moving to the connection position in which the sealing means (146) of the active connection assembly (140) allow fluid communication between both supply conduits (114, 154) through the connector (141) of the active connection assembly (140) and through the connector (161) of the passive connection assembly (160), and supplying the corresponding fluid.

Clause 15. Connecting method according to the preceding clause, wherein during the movement of the active sleeve (145), the path of said active sleeve (45) is compensated for in order to prevent angular and/or axial offsets with respect to the passive connection assembly (160).

What is claimed is:

1. A connection system for transferring a fluid between two vehicles, the connection system comprising:
   an active unit configured to be fixed to one of the two vehicles; the active unit comprising:
      an active connection assembly connected to a first supply conduit, the active connection assembly including a first connector coupled to the first supply conduit, an active sleeve externally coupled to the first connector, and first sealing means fixed inside the active sleeve which, in a fluid disconnection position, surrounds the first connector in a manner that prevents an outflow of the fluid from the first connector;
      drive means configured to move the active sleeve from the fluid disconnection position to a fluid connection position;
   a passive unit configured to be fixed to the other of the two vehicles, the passive unit comprising:
      a passive connection assembly connected to a second supply conduit, the passive connection assembly including a second connector connected to the second supply conduit;
   the drive means configured to move the active sleeve from the fluid disconnection position to the fluid connection position without axially moving the first and second connectors, in the fluid connection position, the active sleeve partially housing the second connector, the first sealing means being arranged on the second connector such that fluid communication between the first and second supply conduits occurs through the respective first and second connectors.

2. The connection system according to claim 1, wherein the first connector includes a first body coupled to the first supply conduit and a first hollow needle fixed to the first body, the first hollow needle including a first bore in fluid communication with the first supply conduit through the first body, the active sleeve being arranged surrounding the first hollow needle such that, in the fluid disconnection position, the first sealing means surrounds the first hollow needle at a location downstream of the first bore to prevent fluid communication between the first and second connectors, in the fluid connection position the first connector is arranged substantially coaxial to the second connector and the first sealing means does not surround the first hollow needle.

3. The connection system according to claim 1, wherein the second connector includes a second body coupled to the second supply conduit and a second hollow needle fixed to the second body, the second hollow needle including second bore in fluid communication with the second supply conduit through the second body, in the fluid connection position the second connector is arranged substantially coaxial to the first connector, the first sealing means surrounding the second hollow needle upstream the bore, allowing an inflow of the fluid through the second bore.

4. The connection system according to claim 2, wherein the second connector includes a second body coupled to the second supply conduit and a second hollow needle fixed to the second body, the second hollow needle including second bore in fluid communication with the second supply conduit through the second body, in the fluid connection position the second connector is arranged substantially coaxial to the first connector, the first sealing means surrounding the second hollow needle upstream the bore, allowing an inflow of the fluid through the second bore.

5. The connection system according to claim 1, wherein active unit includes a main support to which the first connector is coupled and in which the drive means is supported, the active unit further including an auxiliary support to which the active sleeve is coupled, the drive means comprising a lead screw and a geared motor for driving the lead screw, the lead screw configured to act on the auxiliary support to cause a vertical movement of the active sleeve.

6. The connection system according to claim 5, wherein the first connector is coupled to the main support by a first spherical articulation device and/or the second connector is coupled to a main support of the passive connection assembly through a second spherical articulation device.

7. The connection system according to claim 5, wherein the active unit includes first compensation means configured to absorb angular and/or axial offsets in the coupling of the active unit with the passive unit, the active sleeve being coupled to the auxiliary support through the first compensation means.

8. The connection system according to claim 6, wherein the active unit includes first compensation means configured to absorb angular and/or axial offsets in the coupling of the active unit with the passive unit, the active sleeve being coupled to the auxiliary support through the first compensation means.

9. The connection system according to claim 7, wherein the first compensation means includes a floating support and a regulating element, the active sleeve being fixed to the floating support and the floating support being coupled to the auxiliary support through the regulating element.

10. The connection system according to claim 8, wherein the first compensation means includes a floating support and a regulating element, the active sleeve being fixed to the floating support and the floating support being coupled to the auxiliary support through the regulating element.

11. The connection system according to claim 1, wherein the passive connection assembly includes a passive sleeve externally coupled to the second connector and second sealing means fixed inside the passive sleeve, the second sealing means surrounding the second connector such that, in the fluid disconnection position, the second sealing means prevents passage of the fluid through the second connector and, in the fluid connection position, allows passage of the fluid through the second connector due to the active sleeve having caused a movement of the passive sleeve with respect to the second connector.

12. The connection system according to claim 11, wherein the passive unit includes second compensation means configured to absorb angular and/or axial offsets in movement of the passive sleeve, the passive sleeve being coupled to an auxiliary support of the passive unit through the second compensation means.

13. The connection system according to claim 12, wherein the second compensation means includes a floating support and a regulating element, the passive sleeve being fixed to the floating support and the floating support being coupled to the auxiliary support of the passive unit through the regulating element.

14. The connection system according to claim 11, further comprising guide means coupled to an outside of the passive sleeve and configured to align and guide a coupling between the active connection assembly and the passive connection assembly, the guide means housing the active sleeve therein.

15. The connection system according to claim 14, wherein the guide means includes a guide coupled concentric to the passive sleeve, the guide including an intermediate region with openings to enable an outflow of gases or any other particle which may have entered the guide, the intermediate region including an inner diameter greater than an outer diameter of the passive sleeve, which permits the outflow of gases or other particles through the openings.

16. A vehicle comprising a connection system according to claim 1.

\* \* \* \* \*